United States Patent
Hu et al.

(10) Patent No.: US 9,776,284 B2
(45) Date of Patent: Oct. 3, 2017

(54) SYSTEM AND METHOD FOR CUTTING A PASSAGE IN AN AIRFOIL

(71) Applicant: General Electric Company, Schenectady, NY (US)

(72) Inventors: Zhaoli Hu, Greer, SC (US); Abe Denis Darling, Laurens, SC (US); Shamgar Elijah McDowell, Simpsonville, SC (US); Douglas Anthony Serieno, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 493 days.

(21) Appl. No.: 14/602,322

(22) Filed: Jan. 22, 2015

(65) Prior Publication Data

US 2016/0271734 A1   Sep. 22, 2016

(51) Int. Cl.
*B23K 26/384* (2014.01)
*B23K 26/00* (2014.01)
*B23K 26/146* (2014.01)
*B23K 26/0622* (2014.01)
*B23K 101/00* (2006.01)

(52) U.S. Cl.
CPC ........ *B23K 26/384* (2015.10); *B23K 26/0622* (2015.10); *B23K 26/146* (2015.10); *B23K 2201/001* (2013.01)

(58) Field of Classification Search
CPC ........ B23K 26/38; B23K 26/00; B23K 26/14; B23K 26/06; B23K 2201/001
USPC ............. 219/121.62, 121.67–121.72, 121.84
See application file for complete search history.

(56) References Cited

U.S. PATENT DOCUMENTS

| 4,027,137 A | 5/1977 | Liedtke |
| 4,873,414 A | 10/1989 | Ma et al. |
| 4,905,310 A | 2/1990 | Ulrich |
| 4,931,615 A | 6/1990 | Muncy et al. |

(Continued)

FOREIGN PATENT DOCUMENTS

| DE | 3643284 A1 | 6/1988 |
| EP | 0937533 | 8/1999 |

(Continued)

OTHER PUBLICATIONS

U.S. Appl. No. 14/626,955, filed Feb. 20, 2015.

(Continued)

*Primary Examiner* — Samuel M Heinrich
(74) *Attorney, Agent, or Firm* — Dority & Manning, P.A.

(57) ABSTRACT

A method for cutting passages in an airfoil using a liquid-jet guided laser beam includes positioning a frustoconical tip of the liquid-jet guided laser at a first X, Y and Z location that is defined with respect to the airfoil and at a first standoff distance of greater than 5 mm and less than 20 mm from an outer surface of the airfoil. The method also includes generating a laser beam confined within a fluid column via the liquid jet guided laser, wherein the laser beam is aimed at the outer surface. The method further includes monitoring for breakthrough of the laser beam through an inner surface of an inner cavity of the airfoil, shutting off the laser beam once breakthrough is detected and repositioning the frustoconical tip at a second X, Y and Z location and at a second standoff distance. A system for cutting a passage in an airfoil is also disclosed herein.

20 Claims, 5 Drawing Sheets

(56) References Cited

U.S. PATENT DOCUMENTS

| | | | |
|---|---|---|---|
| 4,940,880 A | 7/1990 | Klingel et al. | |
| 4,952,771 A | 8/1990 | Wrobel | |
| 5,182,434 A | 1/1993 | Nakata | |
| 5,222,617 A | 6/1993 | Gregory et al. | |
| 5,367,144 A | 11/1994 | Matsumura et al. | |
| 5,374,803 A | 12/1994 | Yamada | |
| 5,700,989 A * | 12/1997 | Dykhno | B23K 28/02 219/121.45 |
| 5,773,791 A | 6/1998 | Kuykendal | |
| 5,902,499 A | 5/1999 | Richerzhagen | |
| 6,001,219 A | 12/1999 | Caspar | |
| 6,140,604 A | 10/2000 | Somers et al. | |
| 6,165,600 A | 12/2000 | Ivkovich et al. | |
| 6,696,666 B2 | 2/2004 | Weber et al. | |
| 7,163,875 B2 | 1/2007 | Richerzhagen | |
| 7,728,258 B2 | 6/2010 | Richerzhagen et al. | |
| 8,581,141 B2 | 11/2013 | Muratsubaki et al. | |
| 2004/0224179 A1 | 11/2004 | Sokol et al. | |
| 2005/0061787 A1 * | 3/2005 | Byrd | B23K 26/147 219/121.71 |
| 2006/0096964 A1 | 5/2006 | Fordahl | |
| 2007/0193990 A1 | 8/2007 | Richerzhagen et al. | |
| 2007/0278195 A1 | 12/2007 | Richerzhagen et al. | |
| 2009/0001061 A1 | 1/2009 | Beck | |
| 2009/0314753 A1 | 12/2009 | Kosmowski | |
| 2010/0147812 A1 | 6/2010 | Beck et al. | |
| 2010/0147814 A1 | 6/2010 | Watanabe | |
| 2011/0049113 A1 | 3/2011 | Glaesemann et al. | |
| 2011/0076405 A1 | 3/2011 | Raji et al. | |
| 2011/0240615 A1 | 10/2011 | Suruceanu et al. | |
| 2012/0074105 A1 | 3/2012 | Okamoto et al. | |
| 2013/0020292 A1 | 1/2013 | Elfizy et al. | |
| 2013/0146570 A1 | 6/2013 | Forsman et al. | |
| 2013/0206739 A1 | 8/2013 | Reed et al. | |
| 2014/0075755 A1 | 3/2014 | Hut et al. | |
| 2014/0076857 A1 | 3/2014 | Hu et al. | |
| 2014/0076868 A1 | 3/2014 | Hu et al. | |

FOREIGN PATENT DOCUMENTS

| | | |
|---|---|---|
| EP | 2826586 | 1/2015 |
| GB | 2113592 | 8/1983 |
| WO | WO 99/56907 | 11/1999 |

OTHER PUBLICATIONS

U.S. Appl. No. 14/592,217, filed Jan. 8, 2015.
U.S. Appl. No. 14/626,960, filed Feb. 20, 2015.
U.S. Appl. No. 14/592,304, filed Jan. 8, 2015.
U.S. Appl. No. 14/592,224, filed Jan. 8, 2015.
U.S. Appl. No. 14/692,232, filed Jan. 8, 2015.
European Search Report and Opinion issued in connection with corresponding EP Application No. 6151439.3 dated Jul. 6, 2016.
U.S. Appl. No. 14/546,357, filed Nov. 18, 2014.
U.S. Appl. No. 14/602,324, filed Jan. 22, 2015.
U.S. Appl. No. 14/164,522, filed Jan. 27, 2014.
U.S. Appl. No. 14/164,539, filed Jan. 27, 2014.
U.S. Appl. No. 14/164,506, filed Jan. 27, 2014.
Sensors—2012, ISSN 1424-8220; On Line Estimation of Laser-Drilled Hole Depth Using A Machine Vision Method, Chao-Ching Ho et al., Published Jul. 27, 2012, pp. 10148-10162.

* cited by examiner

SYSTEM AND METHOD FOR CUTTING A PASSAGE IN AN AIRFOIL

FIELD OF THE INVENTION

The present invention generally involves a method for manufacturing an airfoil. More specifically, the present invention involves a method for cutting passages in an airfoil using a liquid-jet guided laser system.

BACKGROUND OF THE INVENTION

The efficiency of a gas turbine generally increases with increased combustion gas temperatures. However, excessive temperatures within the turbine may reduce the longevity of the airfoils in the turbine and thus increase repairs, maintenance, and outages associated therewith. As a result, various designs and methods have been developed to provide cooling to the airfoils. For example, a cooling media may be supplied to a cavity or cooling circuit inside the airfoil to convectively and/or conductively remove heat from the airfoil. In particular configurations, the cooling media may flow out of the cavity through passages in the airfoil to provide film cooling over the outer surface of the airfoil. In certain instances a thermal barrier coating is applied to the outer surface of the airfoil to enhance thermal protection and the passages extend through the thermal barrier coating.

A liquid jet guided laser system may be used to create the passages through the airfoil with a reduced risk of chipping the thermal barrier coating. However, the depth of the passages and/or the angle or aspect ratio at which the holes must be cut along the surface of the airfoil generally requires that a nozzle body of the liquid-jet guided laser system be positioned close to the surface of the airfoil. Conventional nozzles are generally cylindrical, flat faced and bulky, thus preventing or impacting precise positioning of the nozzle relative to the airfoil surface. As a result, the laser beam may not completely penetrate through the outer surface, resulting in a damaged airfoil that must be refurbished or discarded. Therefore, an improved liquid-jet guided laser system would be useful.

BRIEF DESCRIPTION OF THE INVENTION

Aspects and advantages of the invention are set forth below in the following description, or may be obvious from the description, or may be learned through practice of the invention.

One embodiment of the present invention is a method for cutting passages in an airfoil using a liquid jet guided laser beam. The method includes positioning a frustoconical tip of the liquid jet guided laser at a first X, Y and Z location that is defined with respect to the airfoil and at a first standoff distance of greater than 5 mm and less than 20 mm from an outer surface of the airfoil. The method also includes generating a laser beam confined within a fluid column via the liquid-jet guided laser, wherein the laser beam is aimed at the outer surface. The method further includes monitoring for breakthrough of the laser beam through an inner surface of an inner cavity of the airfoil, shutting off the laser beam once breakthrough is detected and repositioning the frustoconical tip at a second X, Y and Z location and at a second standoff distance.

Another embodiment of the present invention is a system for cutting a passage in an airfoil. The system includes a liquid-jet guided laser having a nozzle body and a frustoconical tip that is connected or coupled to an end portion of the nozzle body. The frustoconical tip defines a laser passage and an opening along an end surface of the frustoconical tip. The opening provides an exit from the laser passage. The liquid-jet guided laser generates a laser beam confined within a fluid column which exits the frustoconical tip through the opening. The system also includes a multi-axis actuator arm that is connected to the liquid-jet guided laser. The system further includes a controller. The controller is in electronic communication with the liquid-jet guided laser and the multi-axis actuator arm. The controller is programmed to execute logic stored in a memory that maintains a standoff distance between the opening of the frustoconical tip and the outer surface of the airfoil during cutting operations where the standoff distance is between 5 mm and 25 mm.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
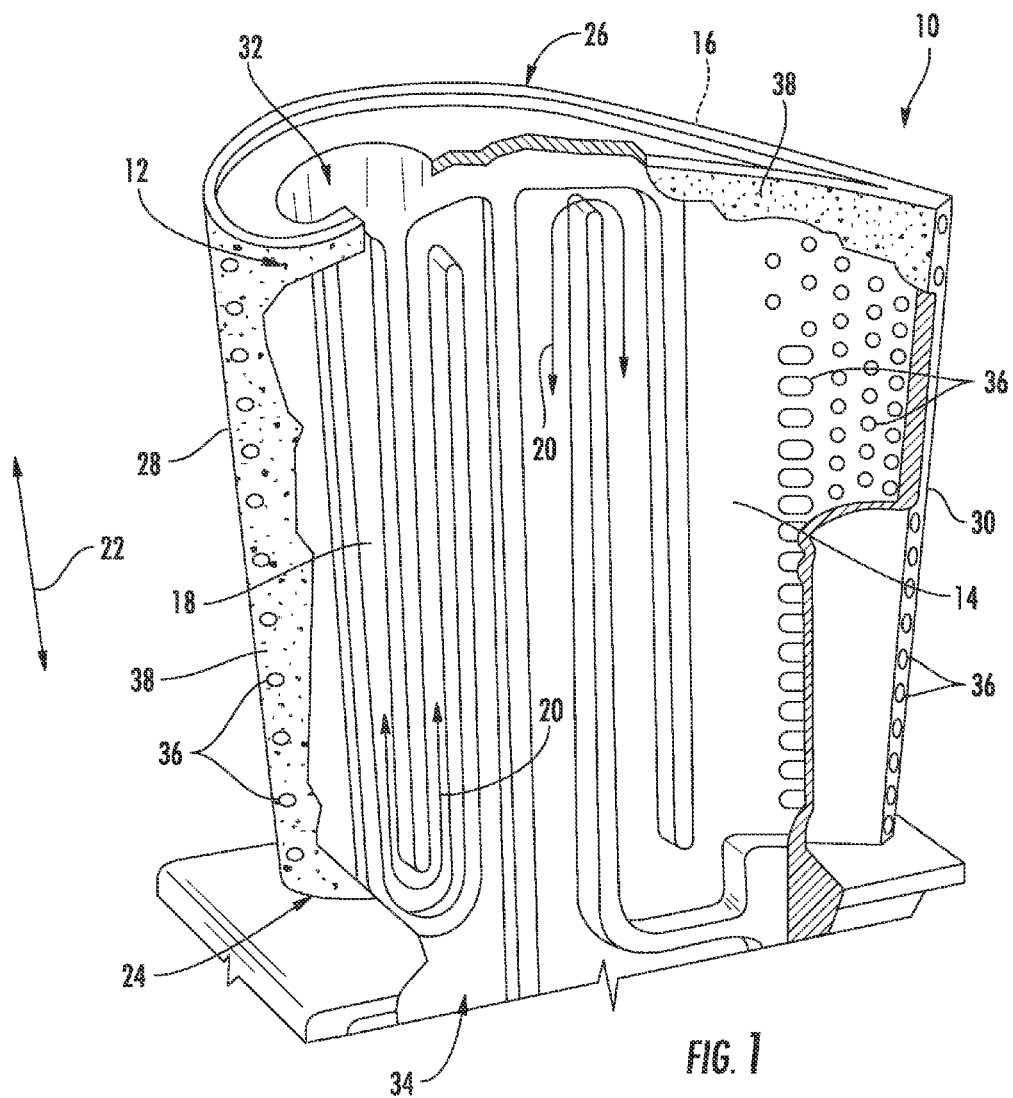
FIG. 1 is a perspective view of an exemplary airfoil according to an embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. In addition, the terms "upstream" and "downstream" refer to the relative location of components in a fluid or optical pathway. For example, component A is upstream from component B if a fluid flows or a laser beam travels from component A to component B. Conversely, component B is downstream from component A if component B receives a fluid flow or laser beam from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system for cutting one or more passages in an airfoil. The system generally includes a liquid-jet guided laser beam which includes a nozzle body and a frustoconical tip. The frustoconical tip directs a laser beam confined by a fluid column towards a work piece such as an airfoil. The confined laser beam may be used to create precise holes at particular angles through an outer surface of the airfoil. For example, the shape of the frustoconical tip allows an operator to position the laser beam at an angle of twenty five degrees or more with respect to an outer surface of the airfoil in order to achieve a required, desired or optimal standoff distance from the outer surface of the airfoil, thus maintaining overall cutting effectiveness of the liquid-jet guided laser beam. Although exemplary embodiments of the present invention will be described generally in the context of an airfoil incorporated into a turbine, one of ordinary skill in the art will readily appreciate from the teachings herein that embodiments of the present invention are not limited to a turbine unless specifically recited in the claims.

Referring now to the drawings, wherein identical numerals indicate the same elements throughout the figures, FIG. 1 provides a perspective view of an exemplary airfoil 10, such as may be incorporated into a turbine or other aeromechanical device. As shown in FIG. 1, the airfoil 10 generally includes an outer surface 12 defining a pressure side 14 and a suction side 16 of the airfoil 10. The pressure side 14 has a generally concave curvature, and the suction side 16 has a generally convex curvature opposed to the pressure side 14. The pressure and suction sides 14, 16 are separated from one another to define an inner cavity 18 such as a cooling circuit inside the airfoil 10.

The inner cavity 18 may provide a serpentine or tortuous path or cooling circuit for directly a purge or cooling medium 20 inside the airfoil 10 to conductively and/or convectively remove heat from the airfoil 10. The pressure and suction sides 14, 16 extend radially in span 22 between a root portion 24 and a tip portion 26 of the airfoil 10. The pressure and suction sides 14, 16 further join to form a leading edge 28 at an upstream portion of the airfoil 10 and a trailing edge 30 at a downstream portion of the airfoil 10. The leading and trailing edges 28, 30 extend radially in span 19 between the root and tip portions 24, 26.

The exemplary airfoil 10 shown in FIG. 1 may be manufactured using any process known in the art. For example, the airfoil 10 may be manufactured by forging, machining, welding, extruding, and/or casting methods readily known in the art. The airfoil 10 may be manufactured from one or more high alloy metals which may include, for example, nickel, cobalt, and/or iron super alloys and similar alloys.

In particular embodiments, the airfoil 10 includes one or more apertures which at least partially define a flow path into the inner cavity 18. The aperture may be positioned at any point along the airfoil 10 and positioning of the aperture is not specifically limited any particular position unless otherwise recited in the claims. For example, in one embodiment the airfoil 10 includes an aperture 32 defined and/or disposed proximate to the tip portion 26 of the airfoil 10. In one embodiment, the airfoil 10 includes an aperture 34 defined and/or disposed proximate to the root portion 24 of the airfoil 10.

In order to provide cooling to the airfoil 10, a plurality of cooling holes or passages 36 may be formed or cut along each or any of the pressure side 14, suction side 16, leading edge 28, and/or trailing edge 30. The passages 36 may provide for fluid communication from the inner cavity 18 through the outer surface 12 of the airfoil 10 to supply a cooling media across the outer surface 12 of the airfoil 10, thus providing for film cooling thereof. One of ordinary skill in the art will readily appreciate from the teachings herein that the number and/or location of the passages 36 may vary according to particular embodiments, and the present invention is not limited to any particular number or location of passages 36 unless specifically recited in the claims.

As shown in FIG. 1, in particular embodiments, a thermal barrier coating 38 may be applied over at least a portion of the outer surface 12 of the airfoil 10. The thermal barrier coating 38 may include low emissivity or high reflectance coatings for heat resistance, a smooth finish, and/or good adhesion to the underlying outer surface 12. For example, thermal barrier coatings known in the art include metal oxides, such as zirconia ($ZrO_2$), partially or fully stabilized by yttria ($Y_2O_3$), magnesia (MgO), or other noble metal oxides.

The selected thermal barrier coating 38 may be deposited by conventional methods using air plasma spraying (APS), low pressure plasma spraying (LPPS), or a physical vapor deposition (PVD) technique, such as electron beam physical vapor deposition (EBPVD), which yields a strain-tolerant columnar grain structure. The selected thermal barrier coating 38 may also be applied using a combination of any of the preceding methods to form a tape which is subsequently transferred for application to the underlying substrate, as described, for example, in U.S. Pat. No. 6,165,600, assigned to the same assignee as the present invention.

Figure 2:
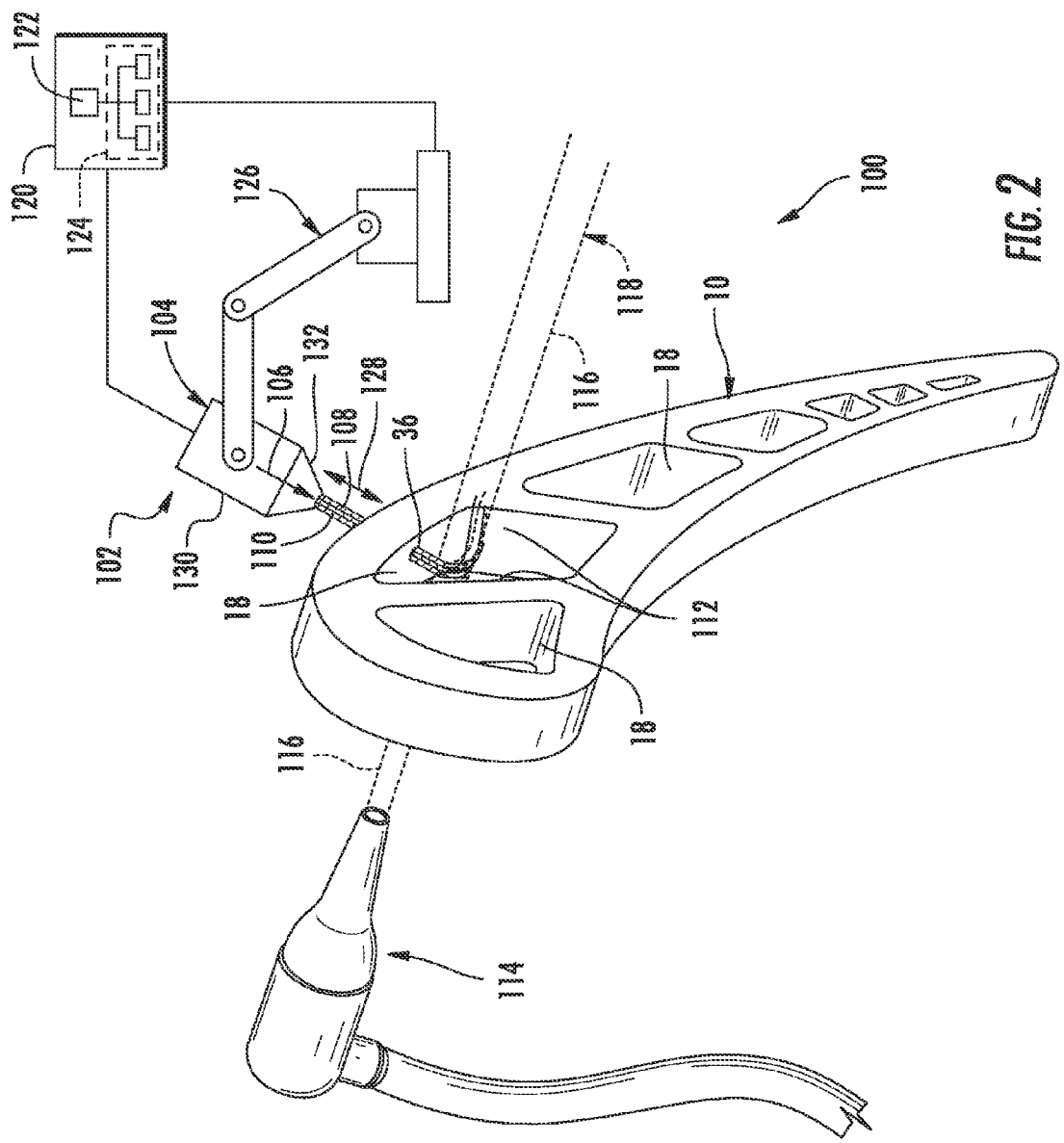
FIG. 2 is a functional block diagram of a system for manufacturing the airfoil shown in FIG. 1, according to various embodiments of the present invention.

FIG. 2 provides a perspective view of a system 100 for forming cooling holes in an airfoil 10. As shown in FIG. 2, the system 100 may include a liquid-jet guided laser 102. The liquid-jet guided laser 102 generally includes a laser 104 capable of generating an unfocused laser beam 106. In exemplary configurations, the unfocused laser beam 106 may have a wavelength of approximately 532 nm, a pulse frequency of approximately 10 kHz, and an average power of approximately 40-50 W.

As shown in FIG. 2, the liquid-jet guided laser 102 is configured to direct the unfocused laser beam 106 into or through a fluid column 108. The laser beam 106 and the fluid column 108 are directed toward the airfoil 10. In particular configurations, the fluid column 108 may comprise a liquid such as deionized water which is capable of focusing the unfocused laser beam 106. The fluid column 108 may have a pressure in the range of approximately 700-1,500 pounds per square inch, although the present invention is not limited to any particular pressure for the fluid column 108 unless specifically recited in the claims. The fluid column 108 acts as a light guide for the unfocused laser beam 106 to create a focused or confined laser beam 110 that may be directed at the airfoil 10. The confined laser beam 110 ablates the outer surface 12 of the airfoil 10 and/or the thermal barrier coating 38 when present, eventually penetrating an inner or inside surface 112 of the inner cavity and creating the desired cooling hole 36 through the airfoil 10.

In particular embodiments, the system 100 includes a purge medium supply 114 fluidly coupled to the inner cavity 18 via aperture 32 or aperture 34 (FIG. 1). The purge medium supply 114 provides a purge medium 116 through the aperture 32, 34 into the inner cavity 18. As used herein, the term "purge medium" may include any gaseous or liquid medium. For example, the purge medium 116 may include an inert gas, a liquid, a saturated steam, a superheated steam or any other suitable medium which may form a purge medium column 118 inside the airfoil 10. As shown in FIG. 2, the purge medium 116 may be aligned to intersect with the fluid column 108 and/or the confined laser beam 110 inside the inner cavity 18 of the airfoil 10.

The purge medium 116 flowing inside the airfoil 10 may have a pressure roughly commensurate with the pressure of the fluid column 108 and which is sufficient to disrupt the fluid column 108 and/or the confined laser beam 110 inside the airfoil 10. For example, the purge medium 116 flowing inside the inner cavity 18 may have a pressure greater than approximately twenty five pounds per square inch, although the present invention is not limited to any particular pressure for the purge medium 116 unless specifically recited in the claims. In one embodiment, the pressure within the inner cavity 18 is maintained or varied between twenty five and eighty pounds per square inch.

Flow speed of the purge medium 116 through the inner cavity 18 may be constant or varied during the cutting or forming process. The flow speed may be based on various factors. For example, the flow speed of the purge medium 116 may be based at least in part on wall thickness of the airfoil 10. Wall thickness may be defined as a thickness or distance between the outer surface 12 or thermal barrier coating 38 and the inner surface 112 of the inner cavity 18. In one embodiment, the flow speed is at least two inches per second for a wall thickness of between eight and ten millimeters. In one embodiment, where the flow speed is at least two inches per second for a wall thickness of between eight and ten millimeters, the pressure of the purge medium within the inner cavity may be between twenty five and eighty pounds per square inch.

In particular embodiments, as shown in FIG. 2, the system 100 includes a controller 120 in electronic communication with the liquid-jet guided laser 102. The controller 120 may be any suitable processor-based computing device. For example, suitable controllers may include personal computers, mobile phones (including smart phones), personal digital assistants, tablets, laptops, desktops, workstations, game consoles, servers, other computers and/or any other suitable computing devices. As shown in FIG. 2, the controller 120 may include one or more processors 122 and associated memory 124. The processor(s) 122 may generally be any suitable processing device(s) known in the art. Similarly, the memory 124 may generally be any suitable computer-readable medium or media, including, but not limited to, RAM, ROM, hard drives, flash drives, or other memory devices.

As is generally understood, the memory 124 may be configured to store information accessible by the processor(s) 122, including instructions or logic that can be executed by the processor(s) 122. The instructions or logic may be any set of instructions that when executed by the processor(s) 122 cause the processor(s) 122 to provide the desired functionality. For instance, the instructions or logic can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

In one embodiment, the system 100 includes a multi-axis actuator 126. The liquid-jet guided laser 102 is connected to the multi axis actuator 126. The multi-axis actuator 126 may be used to position the liquid-jet guided laser 102 at particular X, Y and Z coordinates and at a predefined standoff distance 128 with respect to the airfoil 10. The multi-axis actuator 126 may be electronically coupled to and controlled by the controller 120.

Figure 3:
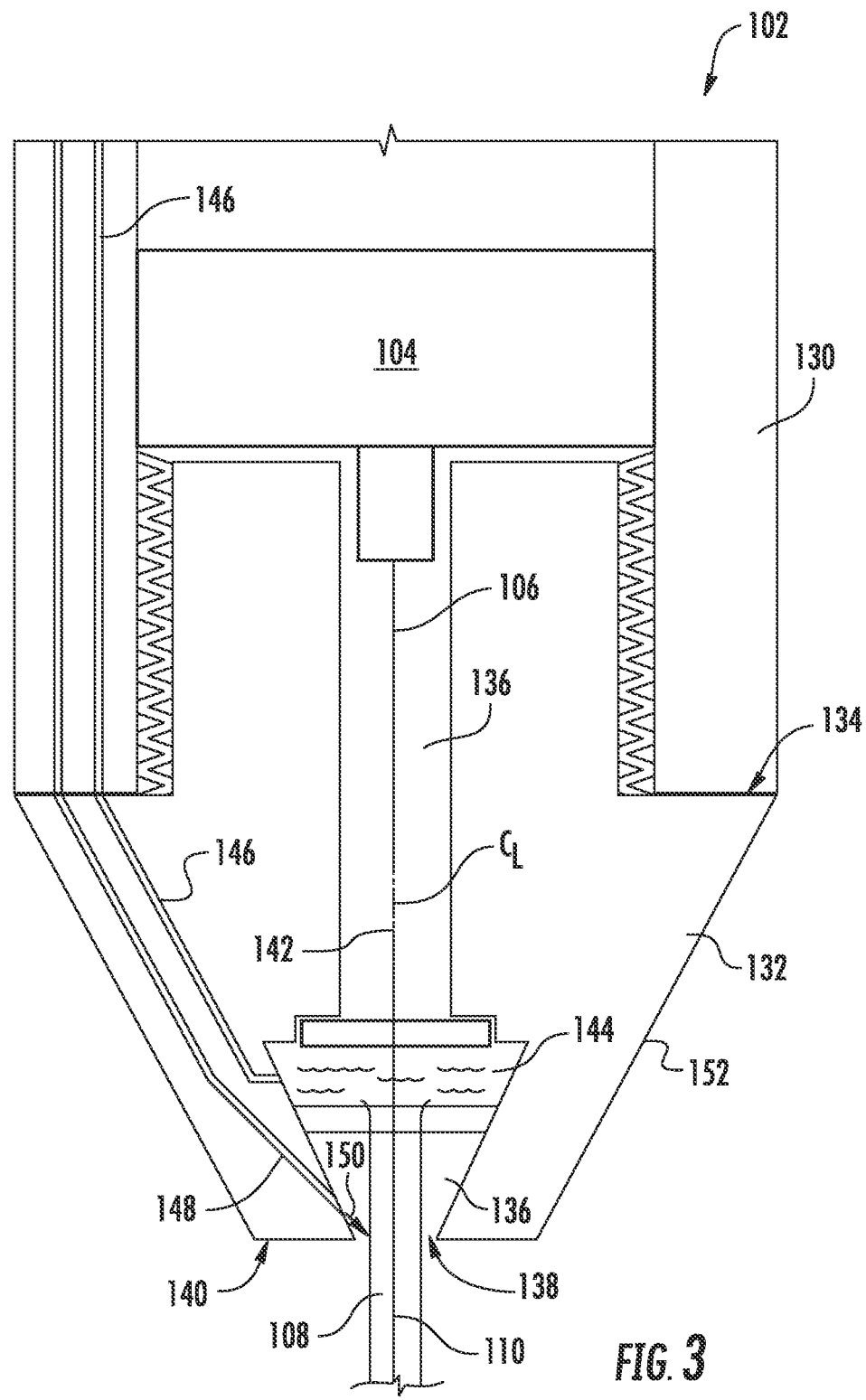
FIG. 3 is a cross sectional side view of a portion of a liquid-jet guided laser according to an exemplary embodiment of the present invention.

FIG. 3 provides an enlarged view of a portion of the liquid-jet guided laser 102 according to various embodiments of the present invention. In at least one embodiment, as shown in FIGS. 2 and 3, the liquid jet guided laser 102 includes a nozzle body 130 and a frustoconical tip 132 connected or coupled to an end portion 134 of the nozzle body 130. In particular embodiments, the laser 104 may be at least partially housed within the nozzle body 130 and may be positioned so as to direct the unfocused laser beam 106 through a laser passage 136 that is at least partially defined within/by the frustoconical tip 132. The laser passage 136 may at least partially define a guide path for directing the unfocused laser beam 106 through the frustoconical tip 132 towards the airfoil 10.

In various embodiments, the frustoconical tip 132 may include and/or define an opening 138 disposed along an end surface 140 of the frustoconical tip 132. The opening 138 defines an exit or outlet from the laser passage 136. In one embodiment, the laser passage 136 diverges radially inwardly with respect to a centerline 142 of the frustoconical tip 132 upstream from the opening 138.

In particular embodiments, a fluid chamber 144 is at least partially defined within the frustoconical tip 132. The fluid chamber 144 is generally aligned with the laser passage 136 such that the unfocused laser beam 106 travels through the fluid chamber 144 upstream from the opening 138. One or more fluid circuits 146 may be defined within the frustoconical tip 132 and/or the nozzle body 130 to provide for fluid communication between a fluid source (not shown) and the fluid chamber 144. In one embodiment, the frustoconical tip 132 and/or the nozzle body 130 at least partially define an assist gas passage 148. The assist gas passage 148 may be used to provide an assist gas 150 to the laser passage 136 which may be used to aid in removal of cutting debris and/or minimize heat-effects on the airfoil 10.

In particular embodiments, as shown in FIG. 3, the frustoconical tip 132 includes an outer surface 152. The outer surface 152 diverges radially inwardly with respect to centerline 142 of the frustoconical tip 132. In one embodiment, the outer surface 152 diverges radially inwardly with respect to centerline 142 from the end portion 134 of the nozzle body 130 to the end surface 140 of the frustoconical tip 132. In other words, the end surface 140 of the frustoconical tip 132 has a smaller cross sectional diameter than the end portion 134 of the nozzle body 130.

Figure 4:
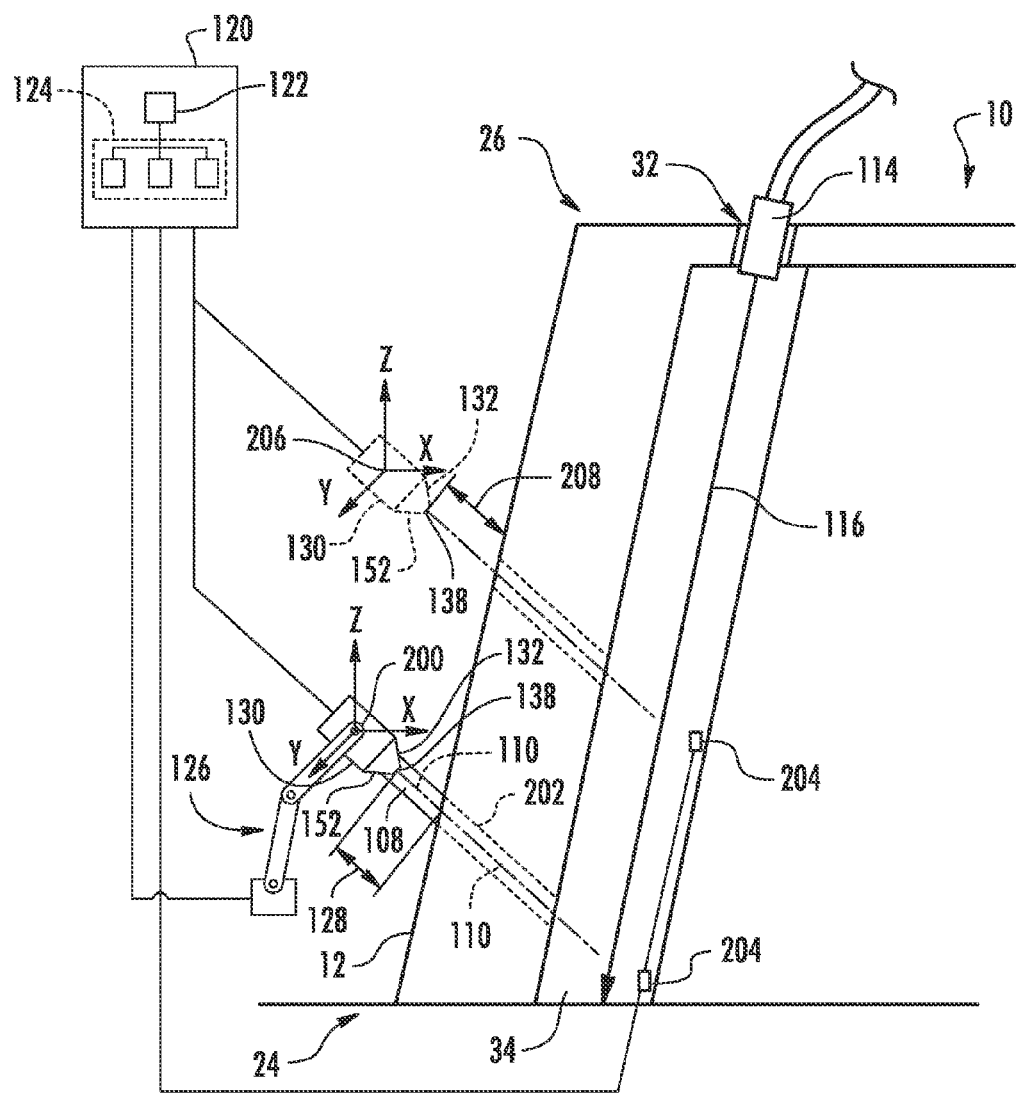
FIG. 4 is a side view of a portion of a nozzle body and a frustoconical tip of the liquid-jet guided laser as shown in FIG. 3, positioned alongside an airfoil according to one embodiment of the present invention.

FIG. 4 provides a side view of a portion of the nozzle body 130 and the frustoconical tip 132 as shown in FIG. 3, positioned alongside the airfoil 10 according to one embodiment of the present invention. In one embodiment, the outer surface 152 of the frustoconical tip 132 may be positioned at an angle of twenty five degrees or more with respect to an outer surface of the airfoil in order to achieve a required, desired or optimal standoff distance from the outer surface of the airfoil, thus maintaining overall cutting effectiveness of the liquid-jet guided laser beam.

In one embodiment, the standoff distance 128 between the opening 138 of the frustoconical tip 132 and/or the end surface 140 of the frustoconical tip 132 and the outer surface 12 of the airfoil 10 is less than about 40 mm. In particular embodiments, the standoff distance 128 is less than 30 mm. In particular embodiments the standoff distance 128 is between about 15 and 25 mm. In particular embodiments, the standoff distance is about 25 mm. In particular embodiments, the standoff distance is between about 10 mm and 15 mm. The standoff distances 128 achievable due to the frustoconical tip 132 allows the confined laser beam 110 to strike or cut the outer surface 12 at a higher energy than when compared to the energy at a greater standoff distance such as greater than 25 mm or 15 mm. As a result, the potential for damaged passages 102 and/or damage to the thermal barrier coating 38 during the cutting process is significantly reduced and/or eliminated.

Figure 5:
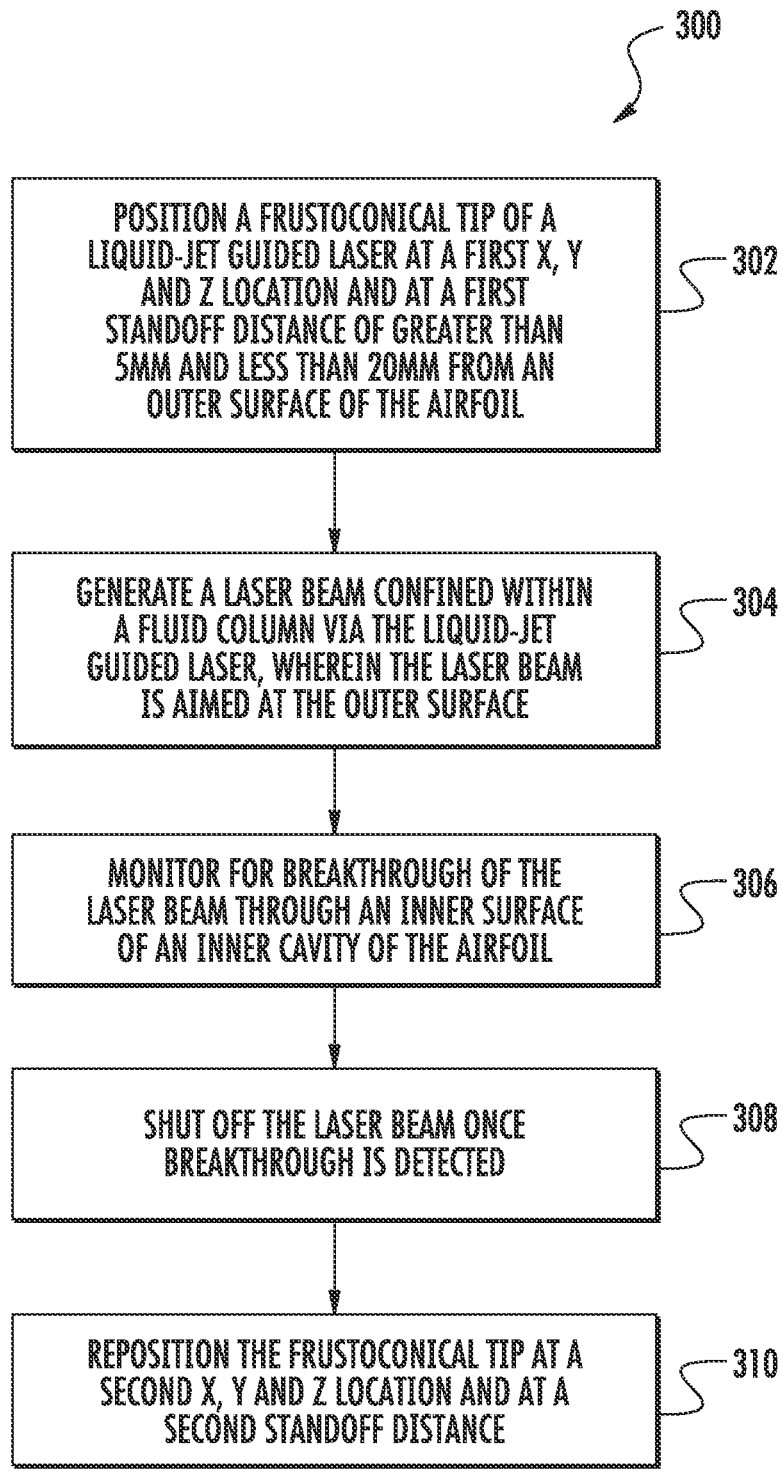
FIG. 5 is a block diagram illustrating steps of an exemplary method for cutting passages in an airfoil, according to one embodiment of the present invention.

One of ordinary skill in the art will readily appreciate that the system 100 described illustrated with respect to FIGS. 2 through 4 may provide a method for cutting passages in an airfoil using a liquid-jet guided laser beam. FIG. 5 provides a block diagram of an exemplary method 300 for cutting passages in an airfoil using a liquid-jet guided laser beam. At 302, method 300 includes positioning the frustoconical tip 132 of the liquid-jet guided laser at a first X, Y and Z location or coordinate 200 defined with respect to the airfoil 10 and at a first standoff distance 128 of greater than 5 mm and less than 20 mm from the outer surface 12 of the airfoil 10. At 304, method 300 includes cutting a first passage 202 via laser beam 110 confined within fluid column 108 and generated by the liquid-jet guided laser 102. At 306, method 300 includes monitoring for breakthrough of the laser beam 110 through the inner surface 112 of the inner cavity 18 of the airfoil 10 via a sensor 204 that is disposed within the inner cavity 18. The sensor 204 may be electronically coupled to the controller 120 and may include a light sensor, acoustic sensor or any sensor suitable for detecting breakthrough of the laser beam 110. At 308, method 300 includes shutting off the laser beam 110 once breakthrough is detected. At 310, method 300 includes repositioning the frustoconical tip 132 at a second X, Y and Z location or coordinate 206 and at a second standoff distance 208.

In particular embodiments, the standoff distance 128 is between 10 mm and 15 mm. In particular embodiments, the method further comprises flowing the purge medium 116 through the inner cavity 112 of the airfoil 10. Method 300 may also include flowing the purge medium 116 through the inner cavity 18 of the airfoil 10 after a predefined number of pulses of the laser beam 110. The pulses of the laser beam 110 may be monitored, tracked and/or counted via the controller 120. In one embodiment, the predefined number of pulses is based at least in part on wall thickness of the airfoil 10 between the outer surface 12 and the inner cavity 18 at the first passage 202. In one embodiment, method 300 further includes tracking pulses of the laser beam via the controller. In one embodiment, wherein if breakthrough is not detected after a predefined number of pulses, method 300 further comprises comparing the number of pulses to a predefined tolerance range via the controller 120. In one embodiment, the laser beam remains on if the number of pulses falls within the predefined tolerance range. In one embodiment, the laser beam is shutoff if the number of pulses falls outside of the predefined tolerance range. In one embodiment, the laser beam 110 is allowed to pulse after breakthrough is detected to ensure complete formation of the passage 202.

In order to effectively cut certain passages along a span of the airfoil 10, particularly at depths required to penetrate the outer surface 12, the inner surface 112 and into the cavity 18 and/or those which need to be cut at a high aspect ratios, it may be necessary to minimize the standoff distance 128 (FIG. 2) between the end surface 140 of the frustoconical tip 132 and the outer surface 12 of the airfoil 10. Non-linear profiles of airfoils 10 generally create areas along the span where it is not possible to achieve a required, desired or optimal standoff 128 distance, due at least in part, to the generally cylindrical shape of conventional nozzle bodies. However, the frustoconical tip 132 of the liquid jet guided laser 102 as presented herein, allows for closer standoff distances to be achieved, thus improving cutting accuracy and/or efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for cutting passages in an airfoil using a liquid-jet guided laser beam, comprising:
    positioning a frustoconical tip of the liquid-jet guided laser at a first X, Y and Z location defined with respect to the airfoil and at a first standoff distance of greater than 5 mm and less than 20 mm from an outer surface of the airfoil;
    generating a laser beam confined within a fluid column via the liquid-jet guided laser, wherein the laser beam is aimed at the outer surface;
    monitoring for breakthrough of the laser beam through an inner surface of an inner cavity of the airfoil;
    shutting off the laser beam once breakthrough is detected; and
    repositioning the frustoconical tip at a second X, Y and Z location and at a second standoff distance.

2. The method as in claim 1, wherein the standoff distance is between 10 mm and 15 mm.

3. The method as in claim 1, further comprising flowing a purge medium through the inner cavity of the airfoil.

4. The method as in claim 1, further comprising flowing a purge medium through the inner cavity of the airfoil after a predefined number of pulses of the laser beam.

5. The method as in claim 4, wherein the predefined number of pulses is based at least in part on wall thickness of the airfoil between the outer surface and the inner cavity at the first passage.

6. The method as in claim 1, further comprising tracking pulses of the laser beam.

7. The method as in claim 6, further comprises comparing the number of pulses to a predefined tolerance range if breakthrough is not detected after a predefined number of pulses.

8. The method as in claim 7, wherein the laser beam remains on if the number of pulses falls within the predefined tolerance range.

9. The method as in claim 6, wherein the laser beam is shutoff if the number of pulses falls outside of the predefined tolerance range.

10. The method as in claim 6, wherein the laser beam is allowed to pulse after breakthrough is detected to ensure complete formation of the passage.

11. A system for cutting a passage in an airfoil, comprising:
    a liquid-jet guided laser having a nozzle body and a frustoconical tip connected to an end portion of the nozzle body, the frustoconical tip defining a laser passage and an opening along an end surface of the frustoconical tip, the opening providing an exit from the laser passage, wherein the liquid-jet guided laser generates a laser beam confined within a fluid column which exits the frustoconical tip through the opening;

a multi-axis actuator arm, wherein the liquid-jet guided laser is connected to the multi-axis arm; and a controller in electronic communication with the liquid-jet guided laser and the multi-axis actuator arm, wherein the controller executes logic stored in a memory that maintains a standoff distance between the opening of the frustoconical tip and the outer surface of the airfoil during cutting operations, wherein the standoff distance is between 5 mm and 25 mm.

12. The system as in claim 11, wherein the frustoconical tip of the liquid-jet guided laser is positioned at a standoff distance that is within a range of 10 mm to 15 mm from the outer surface of the airfoil.

13. The system as in claim 11, wherein the frustoconical tip of the liquid-jet guided laser is positioned at a standoff distance that is within a range of 5 mm to 10 mm from the outer surface of the airfoil.

14. The system as in claim 11, further comprising a sensor disposed within an inner cavity of the airfoil, wherein the controller monitors for breakthrough of the laser beam through an inner surface of the inner cavity via the sensor.

15. The system as in claim 11, further comprising a purge medium supply fluidly connected to an inner cavity of the airfoil, wherein the purge medium supply provides a flow of a purge medium to the inner cavity.

16. The system as in claim 15, wherein the controller activates the purge medium supply after a predefined number of pulses.

17. The system as in claim 16, wherein the predefined number of pulses is based at least in part on wall thickness of the airfoil between the outer surface and the inner cavity at the first passage location.

18. The system as in claim 11, wherein the controller tracks pulses of the laser beam with respect to time and compares the number of pulses to a predefined tolerance range.

19. The system as in claim 18, wherein the controller maintains operation of the laser beam if the number of pulses falls within the predefined tolerance range and if breakthrough of the laser beam through an inner surface of the airfoil is not detected.

20. The system as in claim 11, wherein the controller maintains operation of the laser beam after breakthrough is detected to ensure complete formation of the passage.

\* \* \* \* \*